(12) United States Patent
Murphy et al.

(10) Patent No.: US 10,471,597 B1
(45) Date of Patent: Nov. 12, 2019

(54) ADAPTIVE PERCEPTION FOR INDUSTRIAL ROBOTIC SYSTEMS

(71) Applicant: Amazon Technologies, Inc., Seattle, WA (US)

(72) Inventors: Sean Murphy, Seattle, WA (US); Gurunandan Krishnan Gorumkonda, Seattle, WA (US); Toby Ge Xu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 15/800,847

(22) Filed: Nov. 1, 2017

(51) Int. Cl.
*B25J 9/16* (2006.01)
*B65G 1/137* (2006.01)

(52) U.S. Cl.
CPC .......... *B25J 9/1674* (2013.01); *B65G 1/1373* (2013.01)

(58) Field of Classification Search
CPC combination set(s) only.
See application file for complete search history.

(56) References Cited

U.S. PATENT DOCUMENTS

| 10,089,575 B1* | 10/2018 | Redmon | .................. B25J 9/163 |
| 2016/0167227 A1* | 6/2016 | Wellman | ................ B25J 9/1612 700/259 |

\* cited by examiner

*Primary Examiner* — Kyle O Logan
(74) *Attorney, Agent, or Firm* — Patterson + Sheridan, LLP

(57) ABSTRACT

Method and apparatus for optimizing control of robotic systems. Failures of a robotic device performing a lifting operation for one or more items within a fulfillment center over a window of time are monitored. Responsive to the failures exceeding a predefined threshold number of failures for the window of time, one or more control operations for optimizing performance of the robotic device are determined, by processing environmental metrics, failure type, mode of operation and item type information as inputs to a trained machine learning model. A control system for the robotic device is configured based on the determined one or more control operations, and movement of the robotic device is controlled using the configured control system, to perform the lifting operation for one or more additional items within the fulfillment center.

20 Claims, 9 Drawing Sheets

ADAPTIVE PERCEPTION FOR INDUSTRIAL ROBOTIC SYSTEMS

BACKGROUND

The present description relates to computer vision and, more specifically, to techniques for adaptively controlling industrial robotic systems through the use of machine learning.

Modern inventory systems, such as those in mail-order warehouses, supply chain distribution centers, and custom-order manufacturing facilities, face significant challenges in responding to requests for inventory items. As inventory systems grow, the challenges of simultaneously completing many packing, storing, and other inventory-related tasks become non-trivial. For instance, in product distribution centers (e.g., fulfillment centers), vast quantities of products are processed for shipment to consumers traditionally using manual labor and/or mechanical handling equipment.

Even in highly automated product distribution environments, an employee may be required to manually place a product onto a machine for automated packaging. While it can be advantageous to replace certain manual operations with an automated system (e.g., particular highly repetitive operations which can result in a repetitive use injury to the employee over a period of time), in many situations it is critical that any such automated system operate at a very high rate of success. For example, a robotic arm that retrieves an item from a bin and places the item on a conveyer belt may be unacceptable for use in a product distribution center, if the robotic arm has a high rate of failing to retrieve the item or a significant likelihood of dropping the item on the way to the conveyer belt, as such failures could significantly delay the workflow of the distribution center.

BRIEF DESCRIPTION OF DRAWINGS

Various embodiments in accordance with the present disclosure will be described with reference to the drawings, where like designations denote like elements.

DETAILED DESCRIPTION

Figure 1:
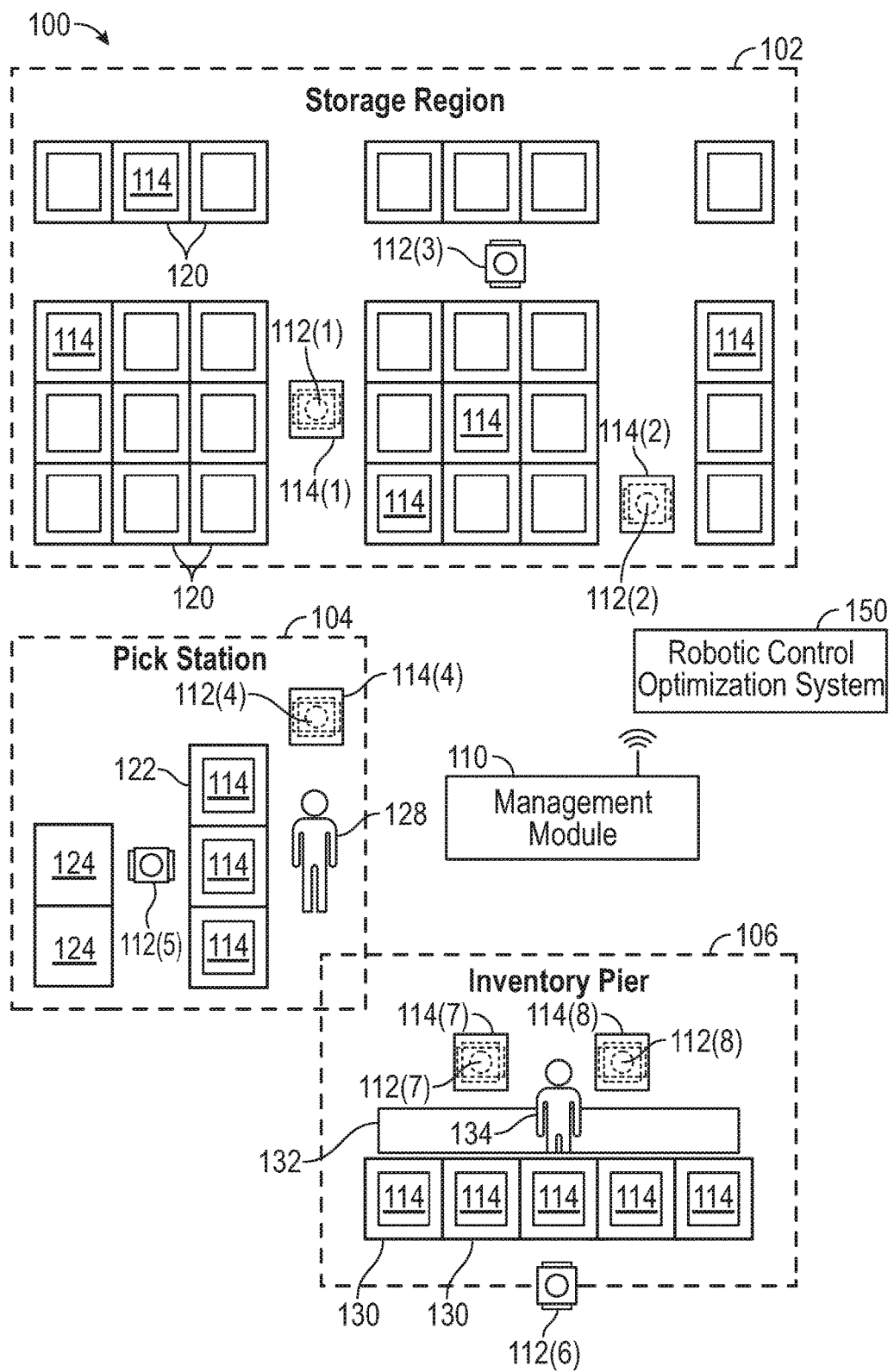
FIG. 1 illustrates an inventory system having multiple regions and mobile drive units that carry inventory holders about the regions, according to one embodiment described herein.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems according to one embodiment described herein utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a pick station for performing inventory operations. The station may include a human operator and/or automated equipment to remove desired inventory items from the inventory holders and complete orders. In some operations, the items are removed from inventory holders and placed on order holders, which too can be maneuvered by the mobile drive units. Throughout this document, reference is made to inventory holders as the racks that are moved about by the mobile drive units. It is noted that inventory holders is used in the general sense as structures that hold inventory items, items that are part of an order, packaging elements for the orders, and essentially any other item or element that might be used by the inventory and fulfillment system. As such, inventory holders may also be referred to as holders, order holders, container holders, bins, and so forth.

Mobile drive units may move about the warehouse and/or retrieve inventory holders in response to commands and/or instructions received from an automated guidance system. For example, the mobile drive units could continuously move the inventory holders into and out from the pick stations to place the appropriate items near the pickers at the right time. ("Pickers" are the human or autonomous operators that retrieve items from the inventory holders.)

Increasingly, automated systems are being used to replace highly repetitive manual operations traditionally performed by employees and which can cause harm (e.g., repetitive use injuries) to the employees over time. However, such automation is particularly challenging to implement in a product distribution center, which frequently process products of dramatically different shapes and sizes. As such, while a robotic tool can be trained to reliably perform a particular action for a particular size and shape of object relatively easily, it is significantly more challenging to implement a robotic tool that can reliably perform the particular action for objects of various shapes and sizes. For example, depending on an object's shape and size, factors such as how to pick-up the object (e.g., with a single suction device, with multiple suction devices, with a robotic claw that grasps the object, etc.), where to pick-up the object (e.g., in the middle of a dense, flat surface with a suction device, as opposed to on a non-rigid surface through which air can easily pass), and so on. As a result, training an automated system to operate in such an environment can be a very difficult task.

Generally, engineers can manually adjust the control of a robotic lifting device to achieve a high level of success in lifting and manipulating a given item. However, this is a manually intensive process and requires a significant amount of experimentation, and such a manual process is impractical to perform for each item processed within a fulfillment center (e.g., which may process millions of different items of varying sizes, shapes, and materials). Moreover, there may be some behaviors of robotic devices that are unintuitive and would require a substantial amount of time and resources to explain. For example, two robotic lifting devices of the same model may perform the same operation with varying degrees of success, where one of the robotic lifting devices may have a slightly higher rate of failure in performing a particular fulfillment operation (e.g., a lifting operation, a carrying operation, a movement operation, and so on) than the other robotic lifting device. While these variances can often be accounted for, the cost and time required for engineers to manually adjust the control of each robotic device within every fulfillment center makes such a venture impractical.

As such, embodiments herein provide techniques for automatically adjusting the control of a robotic device, by determining one or more control operations to adjust by processing a plurality of sensor data and metadata as inputs to a machine learning model. One embodiment includes monitoring one or more failures of a robotic device when performing a lifting operation for one or more items within a fulfillment center over a window of time. Additionally, upon determining that the one or more failures exceed a predefined threshold number of failures for the window of time, one or more control operations for optimizing performance of the robotic device are determined. In determining the control operations, one embodiment includes collecting a plurality of environmental metrics for a physical environment of the robotic device using a plurality of sensor devices, determining a failure type of one or more failures of the performance of the lifting operation by the robotic device, determining a mode of operation used by the robotic device when the one or more failures occurred, and determining an item type of an item that was the target of the performance of the lifting operation by the robotic device. Embodiments can then process the plurality of environmental metrics, the failure type, the mode of operation and the item type as inputs to a trained machine learning model to determine the one or more control operations to perform to optimize the performance of the robotic device. A control system for the robotic device can be configured based on the determined one or more control operations, and movement of the robotic device can be controlled, using the configured control system, to perform the lifting operation for one or more additional items within the fulfillment center. Doing so improves the performance of the robotic device, as the control of the robotic device is optimized based on changes in the device's performance and the environment.

FIG. 1 illustrates an inventory system having multiple regions and mobile drive units that carry inventory holders about the regions. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and an inventory pier 106. In practice, depending upon the size of the inventory system 100, the warehouse may hold more than one of the storage regions 102, pick stations 104, and inventory piers 106, or the warehouse may be configured without the storage region 102, or the pick station 104, or the inventory pier 106.

The inventory system 100 includes a management module 110, multiple mobile drive units 112, inventory holders 114 and a training system 150. Only some of the inventory holders 114 are shown referenced with the number 114 for ease of illustration. The mobile drive units 112 are independent, self-powered robotic devices that may move freely about the warehouse, under their own direction or through coordination by the management module 110. The mobile drive units 112 may be used at various times to transport the inventory holders 114 around the warehouse among the regions. For instance, the mobile drive units 112, may transport the inventory holders 114 between the storage region 102 and the pick station 104 or inventory pier 106.

Each inventory holder 114 may be implemented as a physical structure to hold various inventory items. The inventory holder 114 has a physical length, width, and height that may be standardized or varied within the inventory system. As used herein, the inventory holders 114 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on. Furthermore, as used herein, inventory holders also include holders for other types of products or items and hence include order holders.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112. Each inventory holder 114 may have a plurality of faces, and each bin may be accessible through specific faces. The rack is free-standing when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. An unloaded drive unit 112(3) is also shown moving through an aisle between the predefined storage locations 120.

The pick station region 104 is designed with multiple locations 122 and 124 to accommodate associated resting inventory holder 114. In FIG. 1, the pick station 104 has five locations arranged in two linear rows. A first line of three pick locations 122 is mapped next to a picking area in which a picker 126 picks inventory from the inventory holders 114 at the pick locations 122 and loads them into boxes or containers supported by another inventory holder 114(4) mounted on a mobile drive unit 112(4). In this illustration, the picker 126 is a human, although the picker may alternatively or additionally involve a mechanical picking apparatus. A second line of two staging locations 124 is mapped adjacent to, but spaced from, the first line of pick locations 122. The staging locations 124 temporarily hold inventory holders 114 on the way to and from the pick locations 122 of the pick station 104. It is noted that five locations are merely representative, and that pick stations 104 may be designed with more or fewer than five locations.

Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. Order holders with orders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

In FIG. 1, the inventory pier 106 is shown with multiple designated pier locations 130 to accommodate the inventory holders 114. Five pier locations 130 are illustrated to accommodate five corresponding holders 114, although there may be more or fewer pier locations per inventory pier 106. One mobile drive unit 112(6) is shown at the inventory pier 106 to shuffle inventory holders 114 among the locations 130 according to the techniques described herein. Two loaded mobile drive units 112(7) and 112(8) are shown at rest next to a pier 132 and holding associated inventory holders 114(7) and 114(8) (or more specifically in this case, order holders) for access by a picker 134 (again, represented as a human although a mechanical device may be used). In this example, the inventory holders 114(7) and 114(7) may be holding packages or containers for order fulfillment, where the picker 134 removes selected items from the inventory holders 114 positioned in locations 130 and loads the items into order containers on the inventory holders 114(7) and 114(8).

In some implementations, multiple mobile drive units may be used to bring inventory holders to and from the pier locations 130 of the inventory pier 106. Incoming inventory holders may be placed in temporary locations while a single mobile drive unit, such as unit 112(6), removes an existing inventory holder that has been recently picked by the picker 134 from a pier location 130 and replaces it with a new inventory holder with new items of interest for the picker 134.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, inventory pier 106, etc.). Generally, the shuffle process involves directing a mobile drive unit 112 to reposition a first inventory holder from its current location within the region to a temporary location within the region that is adjacent or proximal to the current location. The mobile drive unit 112 leaves the first inventory holder in the temporary location and subsequently positions a second inventory holder into the location vacated by the first inventory holder. The mobile drive unit 112 then lifts the first inventory unit to transport the first inventory holder away.

The management module 110 may use any form of communication to direct the mobile drive units. In one implementation, the management module 110 and the mobile drive units are configured to communicate using wireless technologies, such as a wireless local area network (MAN). As one example, some embodiments of mobile drive unit 112 may communicate with management module 110 and/or with one another using Wi-Fi (WEE 802.11), Bluetooth (IEEE 802.15), Infrared Data Association standards, or any other appropriate wireless communication protocol. As another example, in a tracked inventory system 100, tracks or other guidance element upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify, particular inventory items that have been purchased by a customer and that are to be retrieved from inventory system 10 for shipment to the customer. The management module 110 may receive the orders from any appropriate system and generates task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system 100. Depending on the component and the task to be completed, a particular task assignment may identify locations, components, and/or actions associated with the corresponding task and/or any other appropriate information to be used by the relevant component in completing the assigned task. In one embodiment, the management module 110 is configured to control one or more robotic picking arms (e.g., at pick station 104) that retrieve specific items from a first location and place these items at a destination location.

Generally, the model management system 150 is configured to optimize the control of a robotic device performing fulfillment operations within the fulfillment center. For example, such a robotic device could operate at the pick station 104 and could be tasked with retrieving items from one or more of the inventory holders 114. In one embodiment, the model management system 150 collects environmental data for a fulfillment center using one or more sensor devices. For example, the model management system 150 could collect a measure(s) of temperature within the fulfillment center, a measure(s) of vibration at one or more points within the fulfillment center, a measure(s) of luminosity at a point within the fulfillment center, and a measure(s) of humidity within the fulfillment center, using one or more sensor devices (e.g., thermometers, humidity monitors, light sensors, etc.). More generally, any type of data describing one or more attributes of the physical environment of the fulfillment center can be collected using any suitable sensor device, according to embodiments described herein.

The model management system 150 can process the environmental data using a machine learning model to determine one or more optimizations for controlling a robotic device within the fulfillment center. For instance, the model management system 150 could determine that the measure of luminosity within the fulfillment center has changed (e.g., due to sunlight coming through a skylight within the fulfillment center), and could input such information into the trained machine learning model to determine how to account for such a change in controlling the robotic device. As an example, an increased amount of light within the physical environment can affect the appearance of items in images captured by camera systems used in the control of the robotic device. The model management system 150 could modify the control of the robotic device based on the determined one or more optimizations. For example, the model management system 150 could apply a determined image filter in a determined manner to the captured digital images. As another example, the model management system 150 could determine one or more attributes of camera systems used to capture the digital images, such as the focal length, angle of view, clipping planes, exposure rate, field of view, distance, resolution, frame rate and so on.

The model management system 150 could subsequently refine the machine learning model based on a determined effect of the one or more optimizations on performance of the robotic device. For example, if the model management system 150 determines that the determined one or more optimizations improved the performance of the robotic device in performing the fulfillment operation, the model management system 150 could determine that the machine learning model correctly determined the optimization(s). In such a circumstance, the model management system 150 could strengthen one or more weights within the machine learning model corresponding to the determined optimizations in view of the environmental data input into the model, so that the model will be more likely to output the determined optimizations when subsequently processing similar environmental data as input. On the other hand, where the optimization(s) produced no noticeable effect on the performance of the robotic device (or decreased the success rate of the robotic device in performing the fulfillment operation), the model management system 150 could rollback the one or more optimizations and could reduce the weights within the machine learning model corresponding to the determined optimizations in view of the environmental data input into the model, so that the model will be less likely to output the determined optimizations when subsequently processing similar environmental data as input.

Figure 2:
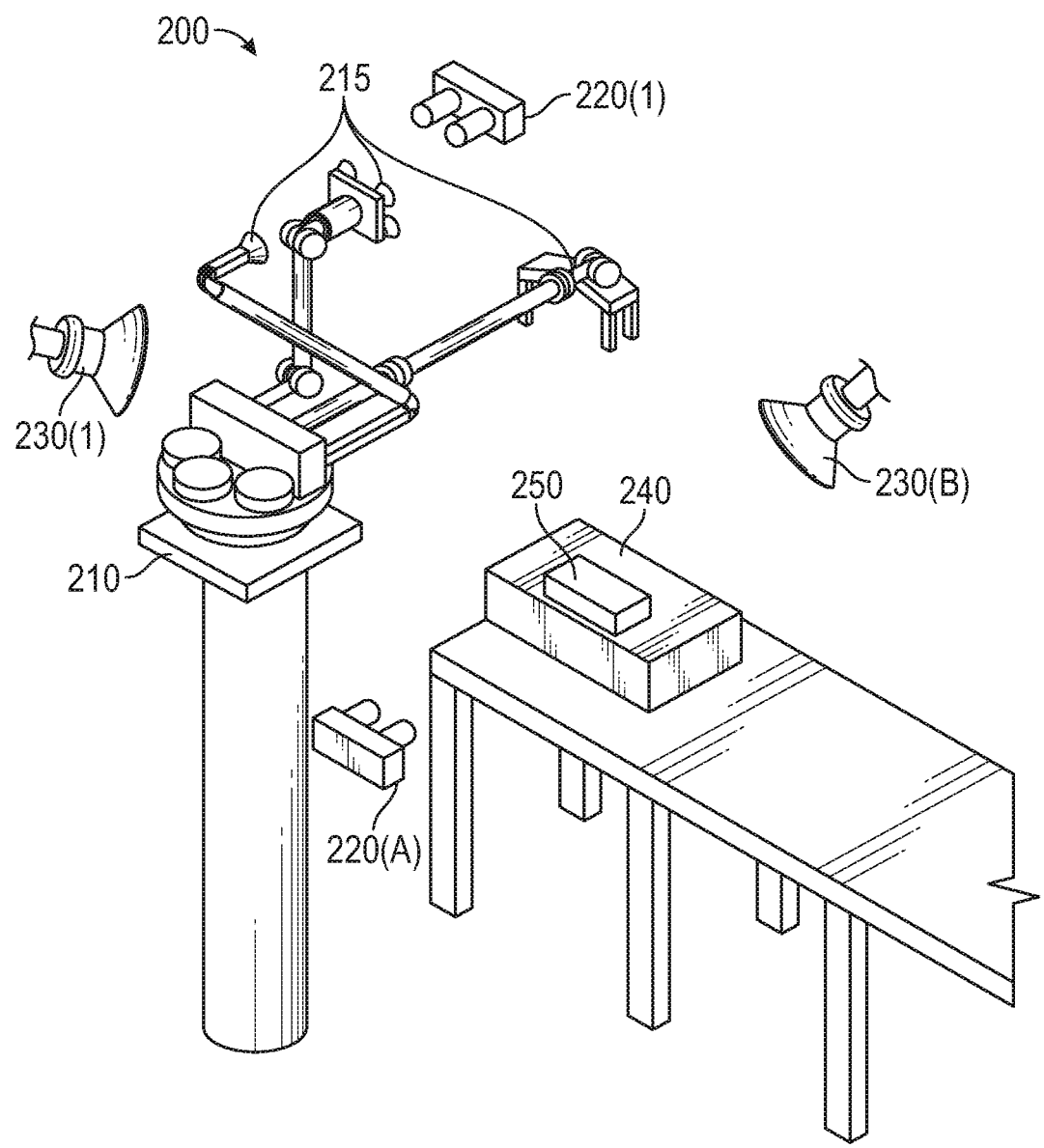
FIG. 2 illustrates a robotic picking environment within a fulfillment center, according to one embodiment described herein.

FIG. 2 illustrates a robotic picking environment within a fulfillment center, according to one embodiment described herein. As shown, the environment 200 includes a robotic picking arm 210, stereo camera devices 220(1)-(A), light sources 230(1)-(B), and an item tote 240 that contains an item 250. The stereo camera devices 220(1)-(A) generally represent camera devices that are oriented so as to capture digital images of the item 250. These images can be used, for example, to validate that the item 250 is of the expected type and is actually present within the item tote 240, to determine where within the item tote 240 the item 250 is located, to determine the orientation of the item 250 within the item tote 240, and so on. Such information could then be used to control the robotic picking arm 210, so as to retrieve the item from the item tote 250 and to carry the item to a specified destination. In one embodiment the stereo camera devices 220(1)-(A) operate in the visible light spectrum. The light sources 230(1)-(B) are positioned so as to illuminate the item 250 within the item tote 240, in order to ensure the item 250 is clearly visible within the digital images captured by the stereo camera devices 220(1)-(A).

The robotic picking arm 210 is configured with a plurality of robotic picking mechanisms 215. For example, as shown, the robotic picking mechanisms 215 include a robotic claw device, as well as a single suction device and a multi-head suction device. Generally, control logic for the robotic picking arm 210 can switch between the robotic picking mechanisms 215, depending on the type of the item 250. For example, while the robotic claw mechanism may be ideal for retrieving some types of items, other items may be too small or too large for retrieval using such a mechanism. As another example, while the suction devices may be ideal for retrieving some items (e.g., a lightweight item with a substantially impermeable surface), but other items may be difficult to reliably retrieve using such a mechanism (e.g., a heavier item with a highly permeable surface). As such, the control logic for robotic picking arm 210 can be configured to select an optimal robotic picking mechanism 215 to retrieve the item 250, based on the type of the item 250.

Although not shown, the environment 200 can be configured a plurality of sensor devices that can collect data on the proximate physical environment (e.g., measures of temperature, humidity, etc.) and the robotic picking arm 210 itself (e.g., measures of vibration, measures of temperature, etc.). Control logic for the robotic picking arm 210 could capture one or more images of the item 250 using the stereo camera devices 220(1)-(A). The control logic could then analyze these images to, e.g., verify that the item 250 is located within the item tote 240, identify a placement of the item 250 within the item tote 240, determine an orientation of the item 250 within the item tote 240, and so on. The control logic could then use such information to select an optimal picking mechanism 215 and to control the movement of the robotic picking arm 210 to retrieve the item 250.

In one embodiment, the control logic could determine that the robotic device has failed to successfully complete the fulfillment operation for the first item. Generally, such a failure can occur in a number of different ways. For example, the robotic picking arm 210 could fail to initially lift the item 250 out of the item tote 240. As another example, the robotic picking arm 210 could drop the item 250 on the way to its destination (e.g., a conveyer belt, another item tote, etc.). As yet another example, the robotic picking arm 210 could fail to drop the item properly at the destination (e.g., at a slightly different point than was intended due to the item rolling, with a different orientation than was intended, etc.). Generally, any number of different failures of different types can be accounted for and addressed using the techniques described herein, and the aforementioned examples are provided without limitation and for illustrative purposes only.

Upon detecting a failure has occurred, the robotic control optimization system 150 can collect sensor data using the plurality of sensor devices and determine, using a trained machine learning model, one or more optimizations for control of the robotic device, based on the collected sensor data. Generally, such optimizations can include the selection of the picking mechanism 215 when retrieving subsequent items of the same type as the item 250, aspects of how the robotic arm 210 was controlled in lifting and moving the item 250 to its intended destination, how the images captured by the stereo camera devices 220(1)-(A) were processed in determining how to control the movement of the robotic arm 210, the amount of light that is output by the lighting devices 230(1)-(B), and so on. For example, the robotic control optimization system 150 could determine that the level of luminosity detected by a sensor proximate to the robotic picking arm 210 within the fulfillment center has decreased (e.g., due to the sun going behind a cloud and less light entering the fulfillment center through a skylight) since the last time an optimization was performed, and thus the robotic control optimization system 150 could determine to increase the level of light emitted by the light-emitting devices 230(1)-(B).

The control logic could then capture images of a second item using the stereo camera devices 220(1)-(N). The control logic could then control the operation of the robotic arm 210 to attempt to perform the fulfillment operation for the second item, based on both the second one or more images and the determined one or more optimizations. In one embodiment, the robotic control optimization system 150 continues to monitor failures of the robotic picking arm 210 in retrieving subsequent items in order to determine whether the determined one or more optimizations improved the performance of the robotic arm 210. The robotic control optimization system 150 could use such information to continue to refine the machine learning model over time.

Of note, while FIG. 2 illustrates an embodiment configured to capture images of an item being manipulated with the robotic picking arm 210 using stereo camera devices 220(1)-(N), more generally data on the appearance of the item can be captured using any number of different techniques and devices. For example, while in the depicted embodiment the stereo camera devices 220(1)-(N) could be used by a three-dimensional vision system to generate a three-dimensional model of the item, in other embodiments time-of-flight cameras (e.g., cameras that measure the time-of-flight of a light signal between the camera and a surface of the item) could be used to generated the three-dimensional model of the item. In various other embodiments, a Light Detection and Ranging (LIDAR) system, a structured lighting system (e.g., in conjunction with stereo cameras and a three-dimensional vision system), ultrasound arrays, x-ray imaging systems, millimeter wave scanners, and so on could be used to generate the three-dimensional model of the item (e.g., for determining the item's position and pose, for use in controlling movement of the robotic picking arm 210). More generally, any systems capable of determining physical attributes of an item for use in controlling a robotic device can be used, consistent with the functionality described herein.

Figure 3:
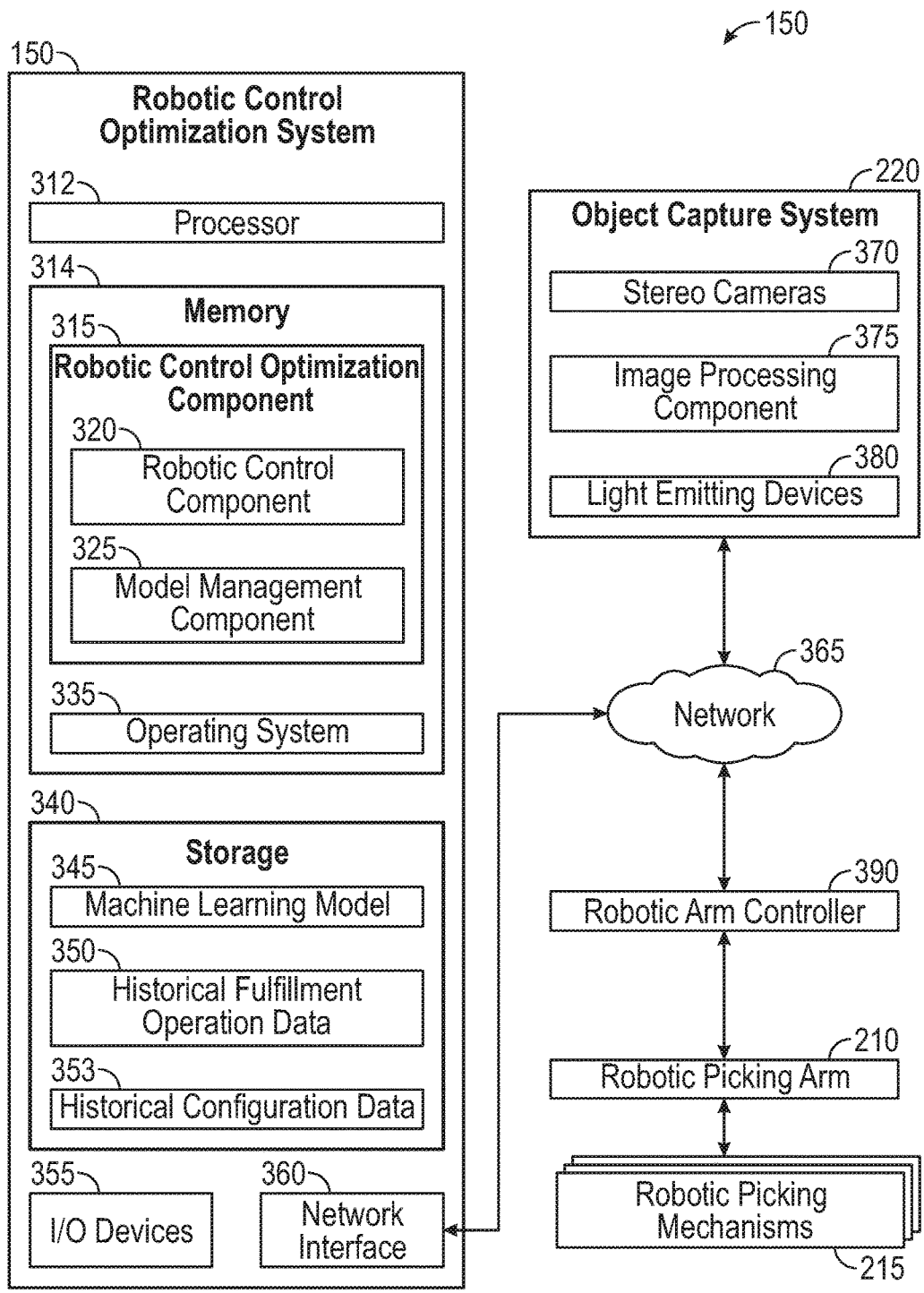
FIG. 3 is a block diagram illustrating a robotic control optimization system, according to one embodiment described herein.

FIG. 3 is a block diagram illustrating a robotic control optimization system, according to one embodiment described herein. As shown, the system 300 includes a model generation system 150, an object capture system 200, sensor devices 368, and a robotic arm controller 390 for controlling a robotic picking arm 210, all connected via network 365. The object capture system 200 includes stereo cameras 370, an image processing component 375, and light-emitting devices 380. Generally, the image processing component 375 processes digital images captured by the stereo cameras 370. For example, the image processing component 375 could perform a color balancing operation across all of the images of a particular item from the stereo cameras 370. As another example, the image processing component 375 may apply one or more filters to the images. More generally, the image processing component 375 can perform any suitable processing on the captured images, according to embodiment described herein. The robotic picking arm 210 includes a plurality of robotic picking mechanisms 215.

The robotic control optimization system 150 includes a processor 312, memory 314, storage 340, I/O devices 355, and a network interface 360. Processor 312 is intended to be representative of a single CPU, multiple CPUs, a single CPU having multiple processing cores, and the like. The memory 314 is included to be representative of a random access memory. As shown, memory 314 includes the robotic control optimization component 315 and an operating system 335. The robotic control optimization component 315 includes a robotic control component 320 and a model management component 325. Storage 340 includes one or more machine learning models 345, historical fulfillment operation data 350 and historical configuration data 353. The storage 340 may be a disk drive storage device. Although shown as a single unit, the storage 340 may be a combination of fixed and/or removable storage, such as fixed disc drives, removable memory cards, optical storage, network attached storage (NAS), or storage-area-network (SAN). The network interface 360 may be any type of network communications allowing the motion analysis system 310 to communicate with other computers via a data communications network (e.g., network 365).

In one embodiment, the robotic arm controller 390 could receive instructions (e.g., from the management module 110) to retrieve a particular item from a specified location. The robotic arm controller 390 could retrieve a 3D model 353 corresponding to the particular item to be retrieved, and the robotic arm controller 390 could capture one or more images of the retrieval location (e.g., a particular holder or tote within an automated product distribution center) using one or more camera devices.

In one embodiment, the robotic arm controller 390 is given instructions to take an item from a particular location, but is not given any identifying information for the item. In such an embodiment, the robotic arm controller 390 could capture images of the item in the particular location and determine which of a plurality of pre-generated 3D models best matches the appearance of the item in the captured images. The robotic arm controller 390 could then retrieve the 3D model that best matches the item, for use in retrieving the item.

Once the 3D model is retrieved, the robotic arm controller 390 can then use the retrieved 3D model 353 for one or more object identification operations. For instance, the robotic arm controller 390 could analyze images captured of the retrieval location and determine whether the particular item is present within the retrieval location. As an example, the robotic arm controller 390 could determine whether any portion of the captured image(s) substantially matches an appearance of the 3D model for the particular item from any viewpoint and from various distances (e.g., a predefined range of distances). If the robotic arm controller 390 determines a portion of the image substantially matches an appearance of the 3D model for the particular item, the robotic arm controller 390 determines that the particular item is present at the retrieval location at a location corresponding to the matching portion of the image.

Additionally, in one embodiment, the robotic arm controller 390 determines an estimated pose of the particular item at the designated location, using the 3D model. For example, the robotic arm controller 390 could extrapolate the item's pose, based on calibration information specifying the relative three-space location of the camera capturing the image, as well as the viewpoint from which the 3D model matched the portion of the captured image. The robotic arm controller 390 can then use the estimated pose of the particular item to determine an optimal way to control the robotic picking arm 392, in order to best retrieve the particular item. For example, the robotic arm controller 390 could determine an angle of approach, an optimal surface for grasping the particular item, and so on, based on the object's estimated pose as well as object profile information for the particular item. For example, the object profile information could specify the optimal surface upon which to grasp the particular item using a suction tool of the robotic picking arm 392. The robotic arm controller 390 could determine a location of the optimal surface, based on the particular item's current pose, and manipulate the robotic picking arm 392 to grasp the particular item by the optimal surface from a determined optimal angle.

In one embodiment, the robotic arm controller 390 determines an optimal manner to release a given object using a corresponding one of the 3D models 353. For example, once the robotic arm controller 390 has picked up the object in an optimal manner, the robotic arm controller 390 could determine an optimal manner to release the object in the specified destination location (e.g., within a tote container within an automated product distribution center). In doing so, the robotic arm controller 390 can retrieve an object profile for the object that specifies an optimal resting surface for the object (e.g., a flat surface of the object on which the object can rest in a stable manner). The robotic arm controller 390 could then determine how to orient the object so that the optimal surface is downward-facing, using the corresponding 3D model.

Generally, the model management component 325 can build and refine the machine learning model 345 to process data collected by the sensor devices 368, as well as additional data such as metadata describing a fulfillment operation for a given item, to determine one or more optimizations that are designed to reduce the failure rate of the robotic picking arm 210 in retrieving and manipulating items. For example, upon detecting a failure for a fulfillment operation has occurred, the robotic control component 320 could collect sensor data from the sensor devices 368, as well as metadata such as the type of item involved in the fulfillment operation, the robotic picking mechanism 215 used in the fulfillment operation, and so on. The robotic control component 320 could then input at least an indication of this information into the machine learning model 345, in order to determine one or more optimizations. For example, the machine learning model 345 could evaluate the various inputs and determine that the image processing component 375 should apply a different filter to digital images captured of subsequent items of a given type, based on the failure under the current environmental conditions. The robotic control component 320 may then transmit one or more instructions to the image processing component 375 to configure the image processing component 375 to implement the specified optimizations.

If the model management component 325 subsequently determines that the performance of the robotic picking arm 210 has improved due to the optimizations, the model management component 325 could refine the machine learning model 345 to strengthen the correlation between the inputs to the machine learning model 345 and the determined optimizations. On the other hand, if the model management component 325 determines that the optimizations decreased the performance of the robotic picking arm 210, the model management component 325 could update the machine learning model 345 to weaken the correlation between the inputs and the determined optimizations, and may rollback the optimizations (e.g., in the aforementioned example, by transmitting one or more instructions to reconfigure the image processing component 375). Doing so enables the model management component 325 to adapt the machine learning model 345 over time.

In one embodiment, the robotic control component 320 evaluates a rate of failure over a window of time in determining whether to use the machine learning model 345 to determine control optimizations for improving the rate of failure. For example, the robotic control component 320 could determine a rate of failure for the robotic picking arm 210 completing a fulfillment operation over a first window of time and determine whether the rate of failure satisfies one or more predefined criteria (e.g., exceeding a threshold rate of failure). If the determined rate of failure satisfies the predefined criteria, the robotic control component 320 could use the machine learning model 345 to determine one or more optimizations for the system 300 and could reconfigure components within the system 300 (e.g., the image processing component 375, the robotic arm controller 390, etc.) based on the determined optimizations.

At a subsequent point in time, the model management component 325 could evaluate whether the determined optimizations improved the performance of the system 300. For example, the model management component 325 could determine a second rate of failure over a second window of time, and compare the second rate of failure with the first rate of failure to determine the effect of the optimizations. The model management component 325 may then refine the machine learning model 345 accordingly, e.g., by strengthening or weakening weights within the machine learning model 345.

Figure 4:
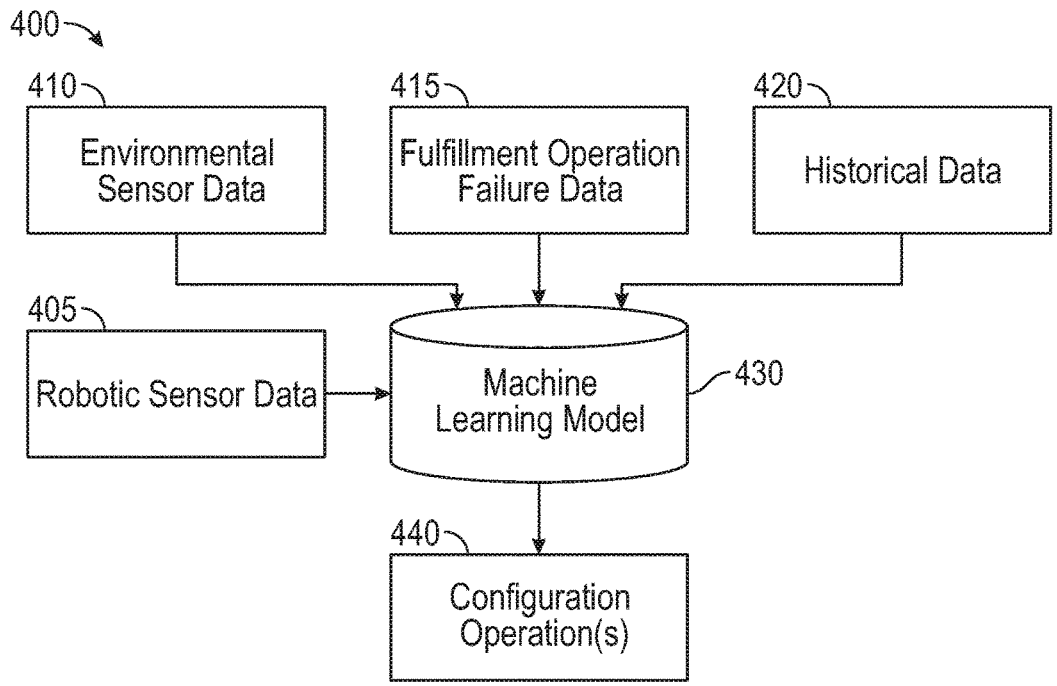
FIG. 4 is a block diagram illustrating a workflow for determining configuration operations for a robotic apparatus through the use of a machine learning model, according to one embodiment described herein.

FIG. 4 is a block diagram illustrating a workflow for determining configuration operations for a robotic apparatus through the use of a machine learning model, according to one embodiment described herein. As shown, the diagram 400 shows robotic sensor data 405, environmental sensor data 410, fulfillment operation failure data 415 and historical data 420 as inputs to a machine learning model 430. Generally, the robotic sensor data 405 represents data captured using sensor devices associated with the robotic picking arm 210, e.g., sensor devices within proximity to the robotic picking arm 210, sensor devices within the robotic picking arm 210, etc. For example, such sensors could capture a measure of temperature at a particular location on the robotic picking arm 210, a measure of vibration at a particular point within the robotic picking arm 210, and so on. The environmental sensor data 410 generally represents sensor data captured from sensors within the physical environment where the robotic picking arm 210 is located. For example, such sensor data could include measures of temperature within a fulfillment center, measure of humidity within a fulfillment center, measures of luminosity within a fulfillment center and so on. The fulfillment operation failure data 415 generally represents metadata describing one or more failure fulfillment operations. For example, the fulfillment operation failure data 415 could specify a type of item involved in the fulfillment operation (e.g., the type of the item being lifted and moved by the robotic picking arm 210), the type of failure that occurred (e.g., a failure to lift the item initially, a failure to maintain a grip on the item after initially lifting the item, a failure to place the item properly at the destination, etc.), and so on. The historical data 420 generally specifies data describing previous fulfillment operations performed by the robotic picking arm 210, such as performance metrics and failure rates of previous iterations of the fulfillment operation by the robotic picking arm 210 over a window of time.

The machine learning model 430 is trained (e.g., by the model management component 325) to consider the input data and to output one or more configuration operations 440 for improving the success rate of the robotic picking arm 210 in performing fulfillment operations. For example, the configuration operations 440 could specify one or more adjustments to image processing operations performed by the image processing component 375 on digital images captured by the stereo cameras 370. As another example, the configuration operations 440 may specify parameters for controlling the robotic picking mechanisms 215 of the robotic picking arm 210, when performing a fulfillment operation on subsequent items of a particular type. For example, where the fulfillment operation failure data 415 indicates that a suction robotic picking mechanism 215 was used to lift an item of a particular item type on a particular surface of the item, the configuration operations 440 could specify to use an increased amount of pressure with the suction robotic picking mechanism 215, when retrieving items of the particular item type using the particular surface of the items. In one embodiment, attributes of the particular surface of the item can be captured (e.g., using one or more tactile sensors on the robotic picking mechanism 215) and can be used as an input to the machine learning model 430.

Figure 5:
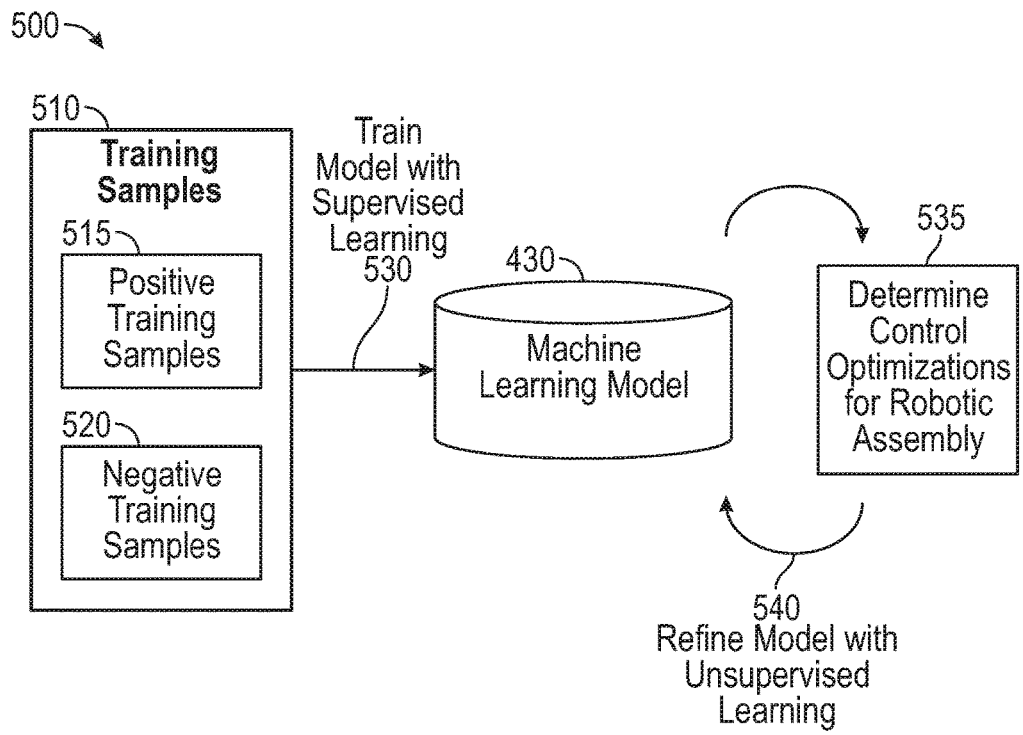
FIG. 5 is a block diagram illustrating a workflow for training and refining a machine learning model for determining configuration operations for a robotic apparatus, according to one embodiment described herein.

Generally, the machine learning model 345 can be initially trained and refined by the model management component 325 in a number of different ways. One such training technique is shown FIG. 5, which is a block diagram illustrating a workflow for training and refining a machine learning model for determining configuration operations for a robotic apparatus, according to one embodiment described herein. As shown, the diagram 500 begins with the model management component 325 training the machine learning model 430 using a supervised learning approach 530. In doing so, the model management component 325 uses the plurality of training samples 510, which include both positive training samples 515 and negative training samples 520. In one embodiment, the positive training samples 515 and negative training samples 520 describe use cases where an optimization to a particular issue is known. In one embodiment, the positive training samples 515 provide an optimization that improves the particular issue and the negative training samples 520 provide an optimization that worsens the particular issue. As an example, the digital images captured by the stereo cameras 370 of the object capture system 200 may be difficult to process when the lighting conditions are outside of an optimal range. Accordingly, where the lighting conditions within the fulfillment center are too dark for optimally capturing digital images, a positive optimization for a positive training sample 515 could be to increase the brightness of the light emitting devices 380. Likewise, under such a circumstance, a negative optimization for a negative training sample 520 could be decreasing the brightness of the light emitting devices 380, or otherwise performing an optimization that does not adequately address the problem (e.g., switching the robotic picking mechanism 215 for items of a given type).

Once the model management component 325 has trained the machine learning model 430, the model management component 325 can continue to refine the model. For example, when the robotic control component 320 uses the machine learning model 430 to determine control optimizations for the robotic assembly 535, the model management component 325 can evaluate the effect of such control optimizations over time and can refine the model using an unsupervised learning approach 540. For example, where the model management component 325 determines that the control optimization improved the performance of the fulfillment operation, the model management component 325 can strengthen weights within the machine learning model 430 that correlate the model's inputs with the determined control optimizations 535, such that the machine learning model 430 will be more likely to determine the particular control optimizations 535 when subsequently processing similar inputs. On the other hand, where the model management component 325 observes that the optimizations worsened or simply did not improve the performance of the fulfillment operation, the model management component 325 could weaken the weights within the machine learning model 430 that correlate the model's inputs with the determined control optimizations 535, such that the machine learning model 430 is less likely to determine the particular control optimizations 535 when subsequently processing similar inputs.

Figure 6:
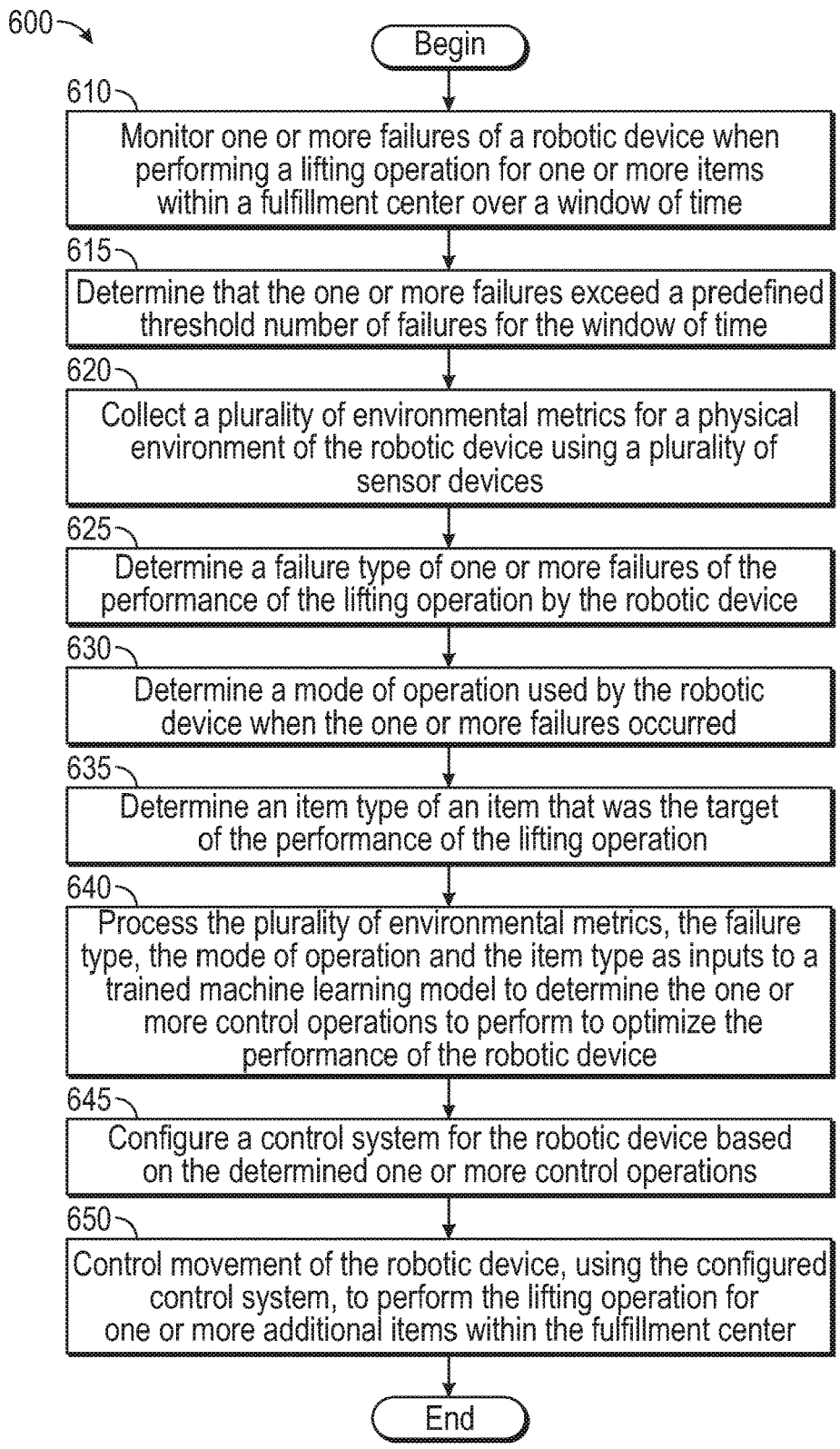
FIG. 6 is a flow diagram illustrating a method of automatically configuring a control system for a robotic device to minimize failures in performing fulfillment operations, according to one embodiment described herein.

FIG. 6 is a flow diagram illustrating a method of automatically configuring a control system for a robotic device to minimize failures in performing fulfillment operations, according to one embodiment described herein. As shown, the method 600 begins at block 610, where a robotic control component 320 monitors one or more failures of a robotic device when performing a lifting operation for one or more items within a fulfillment center over a window of time. The robotic control component 320 determines that the one or more failures exceed a predefined threshold number of failures for the window of time (block 615).

In response, the robotic control component 320 collects a plurality of environmental metrics for a physical environment of the robotic device using a plurality of sensor devices (block 620). The robotic control component 320 also determines a failure type of one or more failures of the performance of the lifting operation by the robotic device (block 625), and determines a mode of operation used by the robotic device when the one or more failures occurred (block 630). For example, the mode of operation could specify which of the robotic picking mechanisms 215 the robotic picking arm 210 was using when the failure occurred. Additionally, the robotic control component 320 could determine an item type of an item that was the target of the performance of the lifting operation by the robotic device (block 635). For example, the robotic control component 320 could determine a unique identifier that uniquely identifies the type of the item within a fulfillment center database.

The robotic control component 320 processes the plurality of environmental metrics, the failure type, the mode of operation and the item type as inputs to a trained machine learning model to determine the one or more control operations to perform to optimize the performance of the robotic device (block 640). The robotic control component 320 configures a control system for the robotic device based on the determined one or more control operations (block 645), and controls movement of the robotic device, using the configured control system, to perform the lifting operation for one or more additional items within the fulfillment center (block 650), and the method 600 ends. For example, in one embodiment, the robotic control component 320 could adjust the control system for the robotic device to adjust the angle of approach and/or surface on which a particular item is lifted, based on the determined control operation(s).

Figure 7:
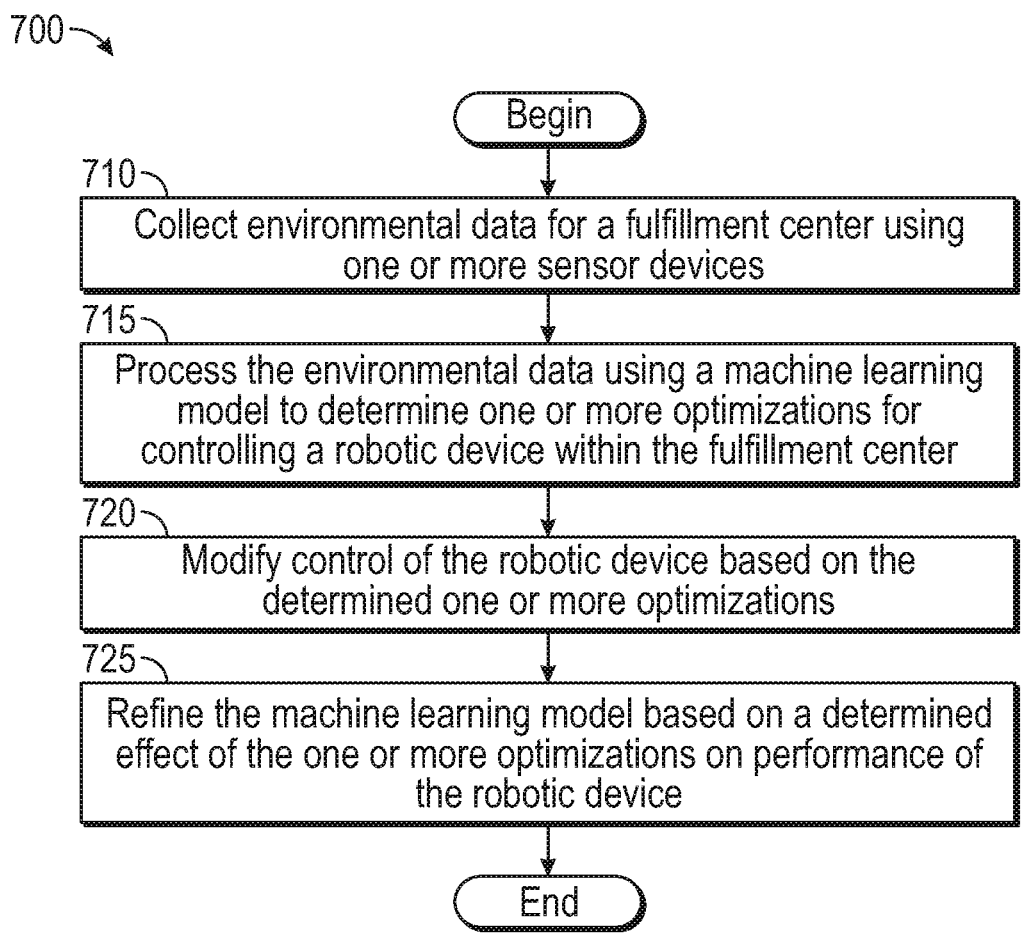
FIG. 7 is a flow diagram illustrating a method of refining a machine learning model for modifying control of a robotic device, according to one embodiment described herein.

FIG. 7 is a flow diagram illustrating a method of refining a machine learning model for modifying control of a robotic device, according to one embodiment described herein. As shown, the method 700 begins at block 710, where the robotic control component 32 collects environmental data for a fulfillment center using one or more sensor devices. The robotic control component 320 processes the environmental data using a machine learning model to determine one or more optimizations for controlling a robotic device within the fulfillment center (block 715). Additionally, the robotic control component 320 modifies control of the robotic device based on the determined one or more optimizations (block 720). The model management component 325 refines the machine learning model based on a determined effect of the one or more optimizations on performance of the robotic device (block 725), and the method 700 ends.

Figure 8:
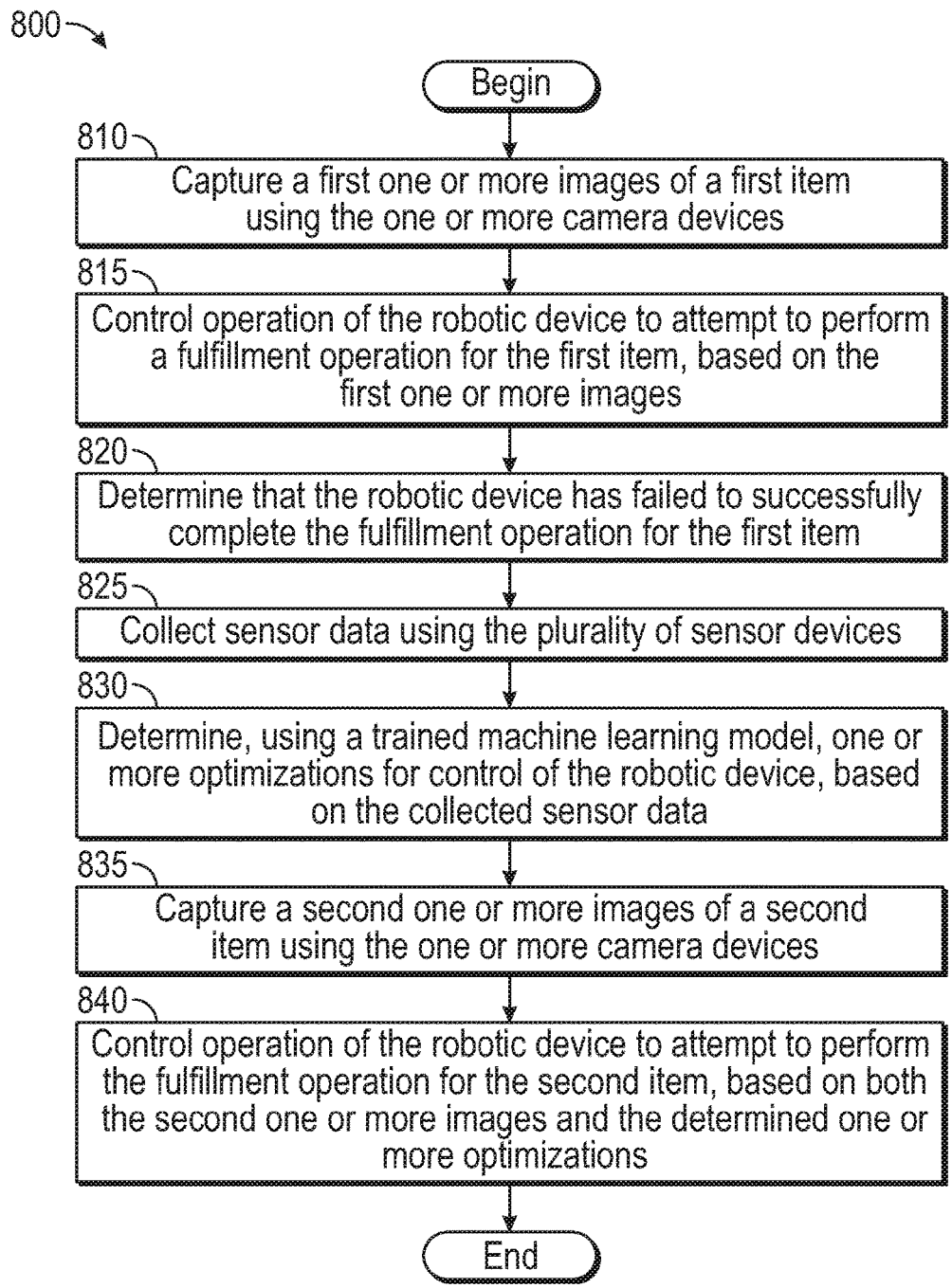
FIG. 8 is a flow diagram illustrating a method of optimizing control of a robotic device based on a previous failure of the robotic device in performing a fulfillment operation, according to one embodiment described herein.

FIG. 8 is a flow diagram illustrating a method of optimizing control of a robotic device based on a previous failure of the robotic device in performing a fulfillment operation, according to one embodiment described herein. As shown, the method 800 begins at block 810, where the robotic control component 320 captures a first one or more images of a first item using the one or more camera devices. For example, the stereo cameras 370 of the object capture system 200 could be used to capture images of the first item from multiple viewing points, while the light emitting devices 380 are shining light onto the first item. Additionally, the image processing component 375 could perform one or more image processing operations (e.g., color balancing, filtering, etc.) on the captured digital images, in order to facilitate the identification of the first item within the digital images.

The robotic control component 320 could control operation of the robotic device to attempt to perform a fulfillment operation for the first item, based on the first one or more images (block 815). The robotic control component 320 determines that the robotic device has failed to successfully complete the fulfillment operation for the first item (block 820), and collects sensor data using the plurality of sensor devices (block 825). Additionally, the robotic control component 320 determines, using a trained machine learning model, one or more optimizations for control of the robotic device, based on the collected sensor data (block 830).

The robotic control component 320 subsequently captures a second one or more images of a second item using the one or more camera devices (block 835) and controls the operation of the robotic device to attempt to perform the fulfillment operation for the second item, based on both the second one or more images and the determined one or more optimizations (block 840), and the method ends. For example, the robotic control component 320 could instruct the image processing component 375 to process the digital images captured by the stereo cameras 370 in a different manner, as determined by the one or more optimizations. As another example, the robotic control component 320 could transmit an instruction to the light emitting devices 380 (or to a controller thereof), instructing the devices to project a different amount of light on items being digitally photographed by the stereo cameras 370.

Figure 9:
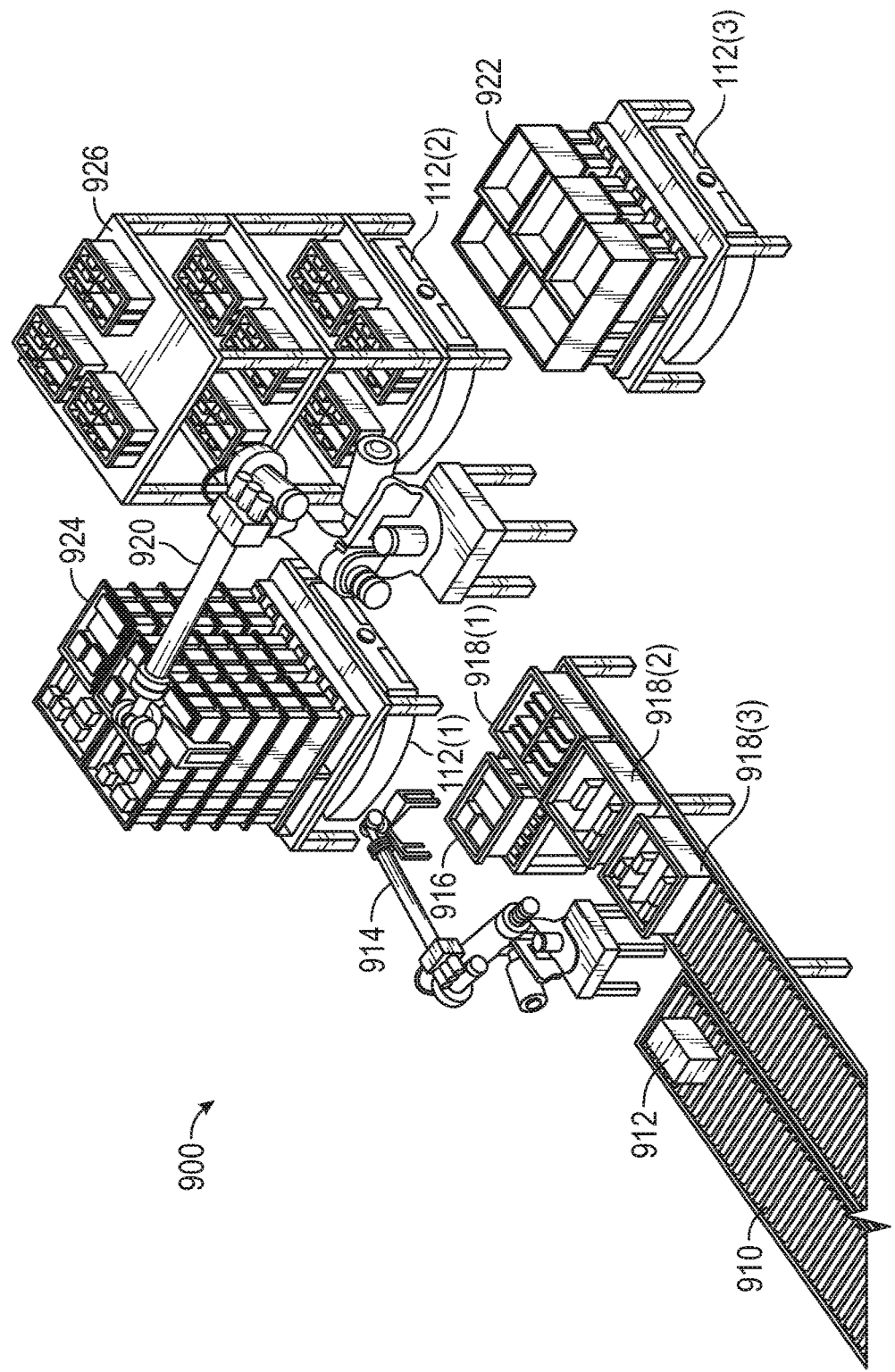
FIG. 9 is a diagram of a pick stow station of the automated materials handling facility in which embodiments can be implemented, according to one embodiment described herein.

FIG. 9 is a diagram of a pick station 112 (also referred to as a pick/stow station) of the automated product distribution center, according to an implementation. As discussed above, the pick/stow station 900 provides the functions of item pick for a shipment set, item stow for placing items into cells of totes that are positioned on an inventory holder 926 and stored at an inventory location within an inventory area of the automated product distribution center, repositioning of items between cells of totes for consolidation of totes, and/or reconfiguration of cells of totes by autonomously repositioning the dividers within the totes.

To facilitate pick/stow operations, the management module 110 sends instructions to a first automated device 112(1), such as a mobile drive unit, that cause the first automated device 112(1) to route a sort pallet 924 from the induction station, discussed above, to the pick/stow station 900. Likewise, instructions are sent to a second automated device 112(2) that cause the second automated device to route an inventory holder 926 to the pick/stow station 900. The inventory holder 926 may be retrieved from an inventory location within the storage region 102 of the automated product distribution center. The inventory holder 926 is configured to store totes that contain inventory and is configured such that it may be autonomously transported by an automated device. In other implementations, other forms of automated storage and retrieval may be used to route an inventory holder, tote, and/or inventory to the pick/stow station. The third automated device 112(3) may receive instructions that cause the third automated device to route a pallet to the pick/stow station that is used to store and/or move empty totes 922. As will be appreciated, different automated devices may be used to route different sort pallets 924, different inventory holders 926, and/or different pallets for storing empty totes 922 to and from the pick/stow station depending on the operation(s) to be performed and/or the items to be handled.

The pick and stow functions of the pick/stow station may be performed in series and with respect to the same totes and/or pallets. For example, the management module 110 may send instructions to a first automated device 920 positioned at the pick/stow station, such as a robotic arm, that cause the first automated device 920 to pick a tote 916 from the sort pallet 924 and place the tote 916 at a first position within the pick/stow station 900. The instructions may also cause the first automated device 920 to pick a tote 918(1) from the inventory holder 926 and position the tote 918(1) at a second position within the pick/stow station 900, as illustrated.

Likewise, the management module 110 could send instructions to the second automated device 914 positioned within the pick/stow station 900, such as a second robotic arm, that cause the second automated device 914 to pick an item from the tote 916 and place the item into a cell of tote 918(1). The instructions may include information that identifies the item to be picked from the tote 916 and cell position information indicating a specific cell within the tote 918(1) into which the item is to be placed.

The second automated device 914 can utilize the information to determine the item in the tote 916 to pick and to determine the cell within the tote 918(1) into which the item is to be placed. In one example, the second automated device 914 may use an image capture device to scan the items in the tote 916 to detect the item and the position of the item within the tote prior to picking the item from the tote 916. Likewise, the cell configuration of the tote 918(1) may be known and the second automated device may place the item in a specific cell within the tote. In some implementations, the second automated device may also use vision to confirm a position or configuration of the cells and the placement of the tote within the cells.

As an alternative to placing an item picked from the tote 916 into a cell of the tote 918(1), the instructions from the management module 110 may cause the second automated device to pick a specific item from the tote 916 and place the item 912 on the induction transport 910. This may be done if an item included in the tote 916 has been associated with a shipment set that is to be fulfilled.

Alternatively, while the tote 918(1) is positioned at the pick/stow station 900, in addition to placing items picked from tote 916 into cells of the tote 918(1), the management module 110 may send instructions to the second automated device 914 that cause the second automated device 914 to pick an item from a specific cell of the tote 918(1) and place the item on the induction transport 910. For example, the second automated device may pick item 912 from a cell of the tote 918(1) in response to instructions from the management module 110 that instruct the second automated device to perform a pick action and identify a position or identifier of a cell within the tote 918(1) from which the item is to be picked.

In some implementations, the first automated device 920, or other automated devices, may place multiple totes, such as totes 918(1), 918(2), 918(3) onto a conveyor of the pick/stow station 900. In such a configuration, the instructions from the material handling control system may instruct the second automated device 916 to pick items from the tote 916 obtained from the sort pallet 924 and place those items into cells of the different totes 918(1), 918(2), 918(3). Likewise, the management module 110 may send instructions to the second automated device to pick one or more items from one or more cells of the totes 918(1), 918(2), 918(3) and place the one or more items on the induction transport 910 so that the item(s) are routed to a packing station for fulfillment of one or more shipment sets.

Still further, the management module 110 may send instructions to the second automated device that cause the second automated device to pick an item from a cell of one of the totes 918(1), 918(2), 918(3) and place the item in a cell of another tote 918(1), 918(2), 918(3). For example, if tote 918(2) includes only one remaining item, the management module 110 may send instructions to the second automated device that cause the second automated device 914 to pick the item from the cell of the tote 918(2) and place the item in a cell of tote 918(3).

Generally, control logic for the automated devices 914 and 920 can manipulate the behavior of a robotic arm of the automated devices 914 and 920 to carry out the instructions. In doing so, the control logic can take into account a 3D model of an item to be manipulated that was generated by the model generation system 150. For example, the management module 110 could send instructions to the second automated device 914 positioned within the pick/stow station 900, that cause the control logic for the second automated device 914 to manipulate its robotic arm to pick an item from the tote 916 and place the item into a cell of tote 918(1). The instructions may include information that identifies the item to be picked from the tote 916 and cell position information indicating a specific cell within the tote 918(1) into which the item is to be placed.

Upon receiving the instructions, the control logic could retrieve a previously generated 3D model that corresponds to the identifying information for the item to be picked from the tote 916. For example, the instructions could specify a unique identifier corresponding to the item. Upon retrieving the 3D model, the control logic could use the 3D model for a variety of different purposes, including item detection, image segmentation and item pose estimation. For example, the control logic could capture an image of the tote 916 and perform an object identification analysis to identify one or more portions of the image that are each representative of a respective object within the tote. The control logic could then compare each of the identified portions to appearances of the 3D model from multiple different viewpoints, to determine whether any of the identified portions sufficiently correspond to a view of the 3D model. For example, if the control logic determines that a particular portion of the captured image is sufficiently similar in appearance to the appearance of the 3D model when viewed from a particular direction, the control logic could determine that the identified item is present within the tote 916 at the location corresponding to the matching portion of the image.

For example, in one embodiment, the robotic arm may be configured with multiple different suction devices of various sizes, with particular suction devices being more optimal for retrieving a particular item (e.g., a suction device that is smaller may not be capable of maintaining sufficient pressure to lift a heavier item, while another suction device may be larger than a surface of the item). Additionally, for some objects, a particular surface may be preferable to other surfaces of the object (e.g., a flat surface that allows little or no air to pass through may be preferable for gripping with a suction device, relative to a malleable surface of a material that allows air to easily pass through). As such, the control logic could determine an optimal surface on which to pick-up the item (e.g., based on an item profile for the item) and could determine a three-space location of the optimal surface based on the pose estimation for the item. The control logic could then direct the robotic arm to use the optimally sized suction tool to grasp the item on the optimal surface. By using the 3D model for the item, the control logic can more accurately determine how and where to optimally grasp the item, thereby improving the functionality of the automated devices 914 and 920.

Additionally, the control logic could estimate the item's pose (or orientation) within the tote 916. Based on such a pose estimation, the control logic could determine an optimal way to retrieve the item from the tote 916 using the robotic arm. For example, the robotic arm may be capable of grasping an item from a number of different directions, but one or more specific directions may be preferable (e.g., resulting in the robotic arm attaining a more secure grip on the item). The control logic could determine a particular viewpoint for viewing the 3D model that best matches the item's appearance within the tote 916, and the control logic could use calibration information that estimates the three-space position of the camera device that captured the image of the item, relative to the pre-defined position where the tote 916 is located, to estimate the item's pose within the tote 916. Using the pose estimation, the control logic could select an optimal manner for retrieving the item from the tote 916 using the robotic arm.

As discussed above, in some circumstances, the robotic arm may fail to perform a fulfillment operation on a given item (e.g., by failing to grasp the item initially, by dropping the item en route to its destination, etc.). In such a circumstance, the robotic control component 320 could determine one or more control operations for optimizing performance of the robotic device. For example, the robotic control component 320 could collect a plurality of environmental metrics for a physical environment of the robotic device using a plurality of sensor devices, and determine a failure type of one or more failures of the performance of the lifting operation by the robotic device (e.g., which type of failure of a plurality of predefined failure types was experienced). The robotic control component 320 could further determine a mode of operation used by the robotic device when the one or more failures occurred. For example, the robotic control component 320 could determine which robotic picking mechanism 215 was used by the robotic picking arm 215 in attempting to retrieve the item. Additionally, the robotic control component 320 could determine an item type of an item that was the target of the performance of the lifting operation by the robotic device.

The robotic control component 320 could process the sensor data, failure and item type data, and the mode of operation data as inputs to a trained machine learning model to determine the one or more control operations to perform to optimize the performance of the robotic device. The robotic control component 320 could then configuring a control system for the robotic device based on the determined one or more control operations. The robotic control component 320 could control movement of the robotic device, using the configured control system, to perform the lifting operation for one or more additional items within the fulfillment center.

Figure 10:
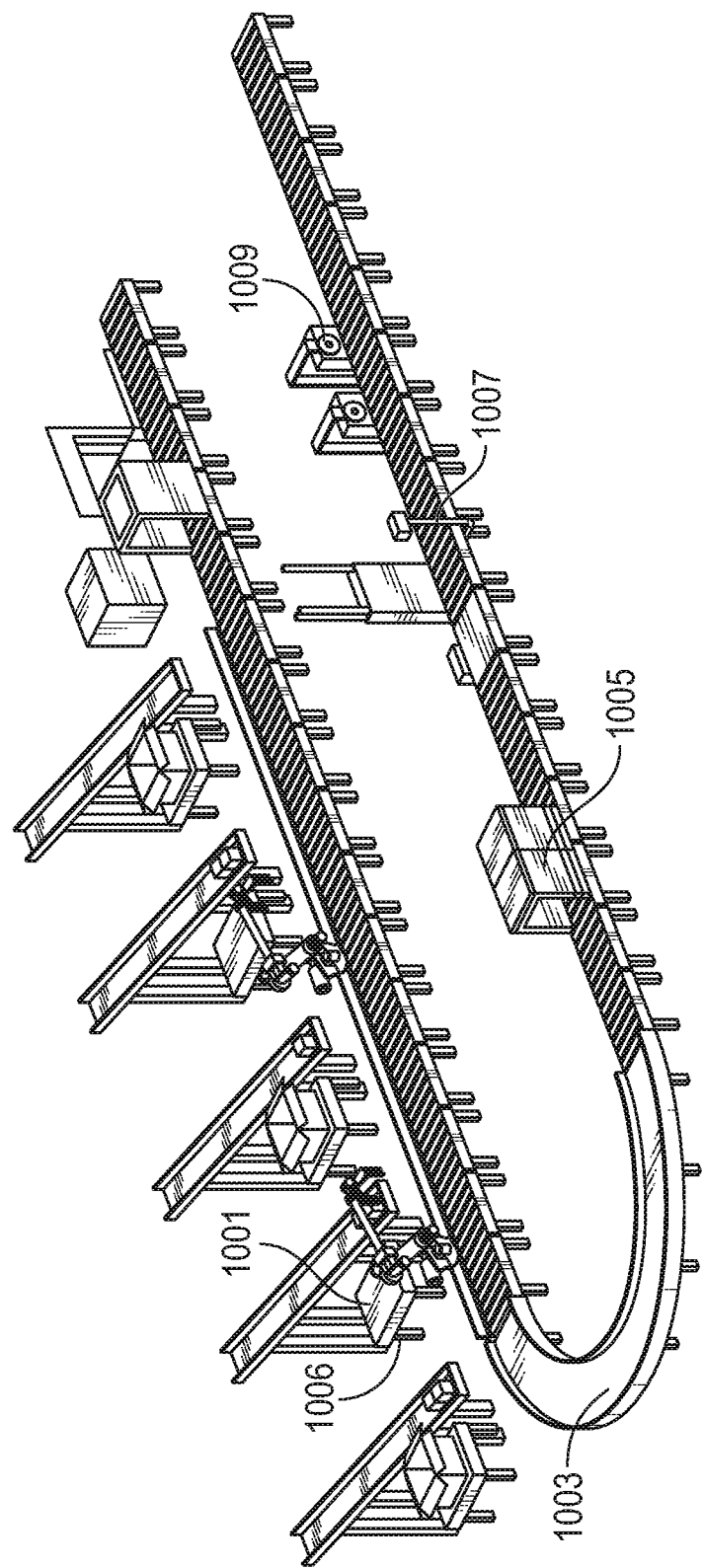
FIG. 10 is a diagram of a packing station in which embodiments can be implemented, according to one embodiment described herein.

FIG. 10 is a diagram of a packing station in which embodiments can be implemented, according to one embodiment described herein. As discussed above, picked items that are used to fulfill a shipment set can be routed by an automated sorter and deposited into a packing slot associated with the item and/or the shipment set. When all the items of the shipment set are positioned in the packing slot, an automated device 1001 (depicted as a robotic arm) is used to pick the items from the packing slot and place the items into a container that is sent along the conveyor 1003 to a shipping station, as discussed above.

For example, a materials handling control system could send instructions to an automated container erection device that causes the automated container erection device to erect a container. The automated container erection device may utilize corrugate to erect a container into which one or more items are placed for shipping. The erected container could then be routed along the conveyor 1003 to a position of the packing slot from which items are to be picked and packed into the container. The automated device 1001 could pick the erected container from the conveyor 1003 and could place the erected container on a pack assembly 1006, so that items from the packing slot can be packed into the container.

The robotic control component 320 could be configured to monitor the behavior of the automated device 1001 and to detect when failures occur (e.g., when the automated devices 1001 is unsuccessful in picking the erected container from the conveyer 1003). The robotic control component 320 could collect environmental data for a fulfillment center using one or more sensor devices. The robotic control component 320 could then process the environmental data using a machine learning model to determine one or more optimizations for controlling the automated device 1001, and could modify control of the automated device 1001 based on the determined one or more optimizations. The model management component 325 could then refine the machine learning model based on a determined effect of the one or more optimizations on performance of the automated device 1001.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the robotic control optimization component 315 could be deployed in the cloud and could transmit control instructions and other information to systems within a fulfillment center. For example, the robotic control optimization component 315 could execute on a computing system in the cloud and could process received data from systems in the fulfillment center. In such a case, the robotic control optimization component 315 could access a trained machine learning model 345 at a storage location in the cloud and could determine one or more control optimizations for a robotic system within the fulfillment center. One or more instructions to implement the control optimizations could then be transmitted to a system within the fulfillment center. Doing so allows fulfillment center systems to access the robotic control optimization component 315 from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
monitoring one or more failures of a robotic device when performing a lifting operation for one or more items within a fulfillment center over a window of time;
upon determining that the one or more failures exceed a predefined threshold number of failures for the window of time, determining one or more control operations for optimizing performance of the robotic device, comprising:
collecting a plurality of environmental metrics for a physical environment of the robotic device using a plurality of sensor devices;
determining a failure type of the one or more failures of the performance of the lifting operation by the robotic device;
determining a mode of operation used by the robotic device when the one or more failures occurred;
determining an item type of an item that was a target of the performance of the lifting operation by the robotic device; and
processing the plurality of environmental metrics, the failure type, the mode of operation and the item type as inputs to a trained machine learning model to determine the one or more control operations to perform to optimize the performance of the robotic device;
configuring a control system for the robotic device based on the determined one or more control operations; and
controlling movement of the robotic device, using the configured control system, to perform the lifting operation for one or more additional items within the fulfillment center.

2. The method of claim 1, wherein the predefined threshold number of failures is a single failure of the performance of the lifting operation.

3. The method of claim 1, wherein the predefined threshold number of failures is based on a threshold rate of failure in performing the lifting operation a plurality of times over the window of time.

4. The method of claim 1, wherein:
the failure type is selected from a plurality of predefined failure types; and
the plurality of predefined failure types comprise at least (i) a failure in picking up an item within the fulfillment center, (ii) a failure in holding onto a picked-up item within the fulfillment center, and (iii) a failure to place the picked-up item at an intended destination location.

5. The method of claim 1, wherein:
the robotic device is configured to pick up items using a plurality of mechanisms;
the robotic device used a first mechanism of the plurality of mechanisms for the mode of operation when the one or more failures occurred; and
the one or more control operations comprise adjusting the mode of operation for the robotic device in performing subsequent lifting operations for items of the determined item type, such that the robotic device uses a different second mechanism of the plurality of mechanisms when performing the subsequent lifting operations for the items of the determined item type.

6. The method of claim 1, wherein configuring the control system for the robotic device based on the determined one or more control operations comprises:
adjusting one or more software components of the control system to perform one or more filtering operations on images captured of items in performance of subsequent lifting operations by the robotic device within the fulfillment center, in a manner defined by the one or more control operations.

7. A non-transitory computer-readable medium containing computer program code that, when executed by operation of one or more computer processors, performs an operation, comprising:
collecting environmental data for a fulfillment center using one or more sensor devices;
processing the environmental data using a machine learning model to determine one or more optimizations for controlling a robotic device within the fulfillment center;
modifying control of the robotic device based on the determined one or more optimizations, comprising adjusting one or more image processing operations that are performed on one or more images captured by one or more camera devices, during performance of a fulfillment operation by the robotic device; and
refining the machine learning model based on a determined effect of the one or more optimizations on performance of the robotic device.

8. The non-transitory computer-readable medium of claim 7, wherein the environmental data includes at least one of (i) a measure of temperature within the fulfillment center, (ii) a measure of vibration within the fulfillment center, (iii) a measure of luminosity within the fulfillment center, and (iv) a measure of humidity within the fulfillment center.

9. The non-transitory computer-readable medium of claim 7, wherein refining the machine learning model based on the determined effect of the one or more optimizations comprises:
upon determining that the one or more optimizations reduced a rate of failure of the robotic device in performing one or more fulfillment operations within the fulfillment center over a window of time, refining the machine learning model to strengthen an association between the environmental data and the one or more optimizations.

10. The non-transitory computer-readable medium of claim 7, wherein refining the machine learning model based on the determined effect of the one or more optimizations comprises:

upon determining that the one or more optimizations increased a rate of failure of the robotic device in performing one or more fulfillment operations within the fulfillment center over a window of time, refining the machine learning model to weaken an association between the environmental data and the one or more optimizations.

11. The non-transitory computer-readable medium of claim 7, wherein the operation further comprises:
initially training the machine learning model by processing a plurality of positive and negative training samples using a supervised learning approach to generate a baseline machine learning model.

12. The non-transitory computer-readable medium of claim 11, wherein the operation further comprises:
refining the initially trained machine learning model using an unsupervised learning approach, so as to generate the machine learning model that is trained specifically for the fulfillment center.

13. The non-transitory computer-readable medium of claim 7, wherein the one or more image processing operations include at least one of (i) applying an image filter to the one or more images, (ii) applying an transformation operation to the one or more images, (iii) adjusting a contrast of one or more pixels within the one or more images, and (iv) performing a color balancing operation on the one or more images.

14. The non-transitory computer-readable medium of claim 7, wherein modifying control of the robotic device based on the determined one or more optimizations further comprises adjusting an amount of pressure used by the robotic device to grip an item, during performance of the fulfillment operation by the robotic device.

15. The non-transitory computer-readable medium of claim 7, wherein modifying control of the robotic device based on the determined one or more optimizations further comprises adjusting a selection of one of a plurality of gripping mechanisms used by the robotic device to grip an item, during performance of the fulfillment operation by the robotic device.

16. A system, comprising:
one or more camera devices configured to capture images of one or more items within a fulfillment center;
a robotic device configured to perform a fulfillment operation on the one or more items;
a plurality of sensor devices disposed within a physical environment of the robotic device;
one or more computer processors; and
a memory containing computer program code that, when executed by operation of the one or more computer processors, performs an operation comprising:
capturing a first one or more images of a first item using the one or more camera devices;
controlling operation of the robotic device to attempt to perform a fulfillment operation for the first item, based on the first one or more images;
determining that the robotic device has failed to successfully complete the fulfillment operation for the first item;
collecting sensor data using the plurality of sensor devices;
determining, using a trained machine learning model, one or more optimizations for control of the robotic device, based on the collected sensor data;
optimizing one or more attributes of the one or more camera devices based on the determined one or more optimizations;
after optimizing the one or more attributes of the one or more camera devices based on the determined one or more optimizations, capturing a second one or more images of a second item using the one or more camera devices; and
controlling operation of the robotic device to attempt to perform the fulfillment operation for the second item, based on both the second one or more images and the determined one or more optimizations.

17. The system of claim 16, wherein controlling operation of the robotic device to attempt to perform the fulfillment operation for the second item comprises:
adjusting an amount of pressure used by the robotic device to grip the second item, based on the determined one or more optimizations.

18. The system of claim 16, wherein controlling operation of the robotic device to attempt to perform the fulfillment operation for the second item comprises:
adjusting a selection of one of a plurality of gripping mechanisms used by the robotic device to grip the second item, based on the determined one or more optimizations.

19. The system of claim 16, the operation further comprising:
upon determining that the determined one or more optimizations for the control of the robotic device decreased a measure of success for the performance of the fulfillment operation by the robotic device, refining the trained machine learning model for use in determining subsequent optimizations.

20. The system of claim 16, wherein determining that the robotic device has failed to successfully complete the fulfillment operation for the first item comprises:
determining, based on data collected using the plurality of sensor devices, that one of a plurality of recognized failure types has occurred, wherein the plurality of recognized failure types include at least (i) a failure in picking up an item within the fulfillment center, (ii) a failure in holding onto a picked-up item within the fulfillment center, and (iii) a failure to place the picked-up item at an intended destination location.

* * * * *